(12) United States Patent
Liang

(10) Patent No.: US 8,421,777 B2
(45) Date of Patent: Apr. 16, 2013

(54) STYLUS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 413 days.

(21) Appl. No.: 12/819,294

(22) Filed: Jun. 21, 2010

(65) Prior Publication Data
US 2011/0181555 A1 Jul. 28, 2011

(30) Foreign Application Priority Data
Jan. 26, 2010 (CN) .................. 2010 1 0300699

(51) Int. Cl.
*G06F 3/033* (2006.01)
(52) U.S. Cl.
USPC ..................................... 345/179; 178/19.01

(58) Field of Classification Search .................. None
See application file for complete search history.

(56) References Cited

U.S. PATENT DOCUMENTS

| | | | | |
|---|---|---|---|---|
| 4,927,986 A * | 5/1990 | Daly | ............... | 178/19.01 |
| 6,612,918 B2 * | 9/2003 | Livingston et al. | ............... | 452/53 |
| 2003/0067453 A1 * | 4/2003 | Liu et al. | ............... | 345/179 |
| 2007/0197976 A1 * | 8/2007 | Jacobs et al. | ............... | 604/218 |
| 2007/0268278 A1 * | 11/2007 | Paratore et al. | ............... | 345/179 |
| 2011/0115752 A1 * | 5/2011 | Liang | ............... | 345/179 |

* cited by examiner

*Primary Examiner* — Van Chow
(74) *Attorney, Agent, or Firm* — Altis Law Group, Inc.

(57) ABSTRACT

A stylus comprises a housing, a stylus body and a retaining structure. The housing has a receptacle defined therethrough. The retaining structure is configured to provide a mechanism for the stylus body to latch in the receptacle of the housing. The retaining structure includes a set of retaining members and a set of retaining slots that engage the retaining members.

7 Claims, 3 Drawing Sheets

STYLUS

BACKGROUND

1. Technical Field

This exemplary disclosure generally relates to writing implements, and particularly to styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses have complex structures.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, stylus body-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
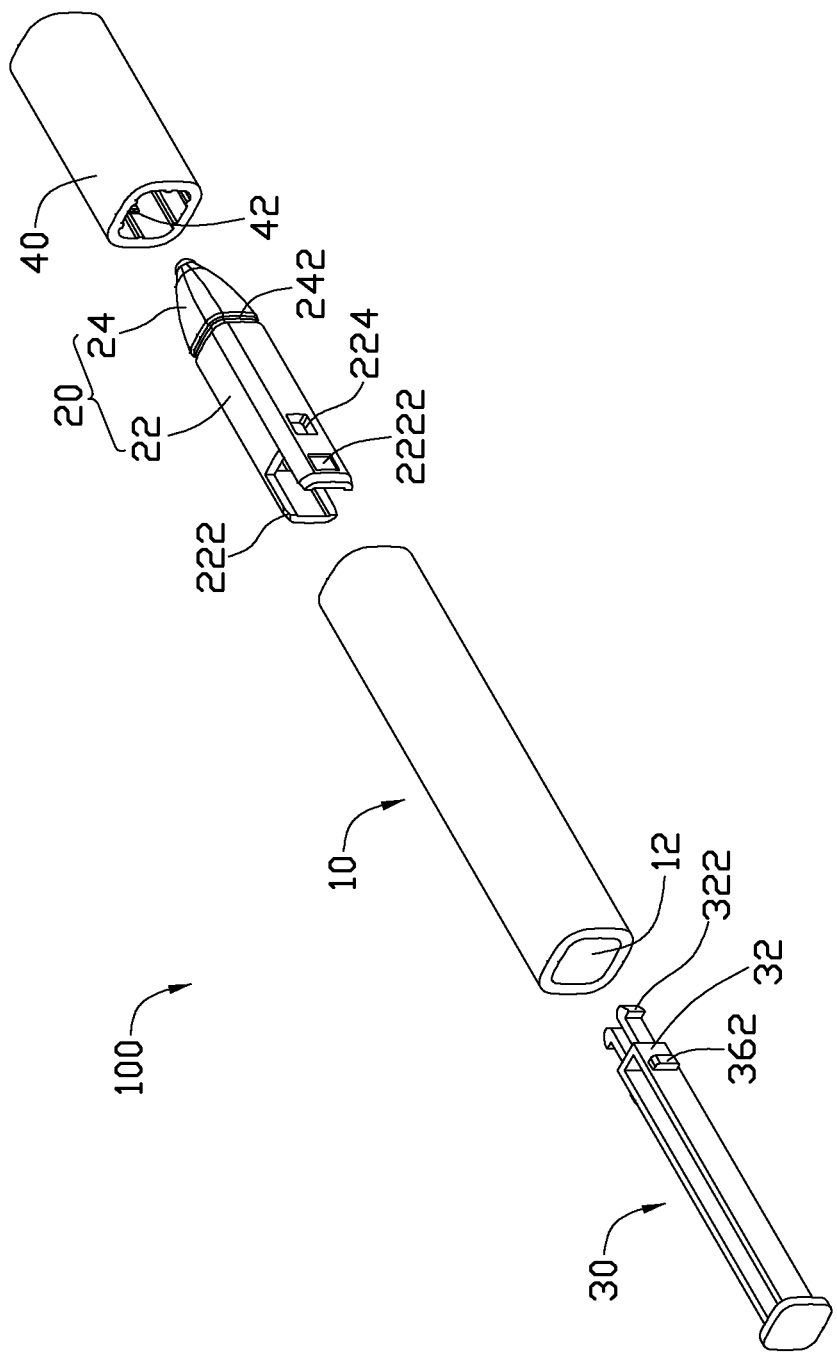
FIG. 1 is an exploded view of an exemplary stylus.
Figure 3:
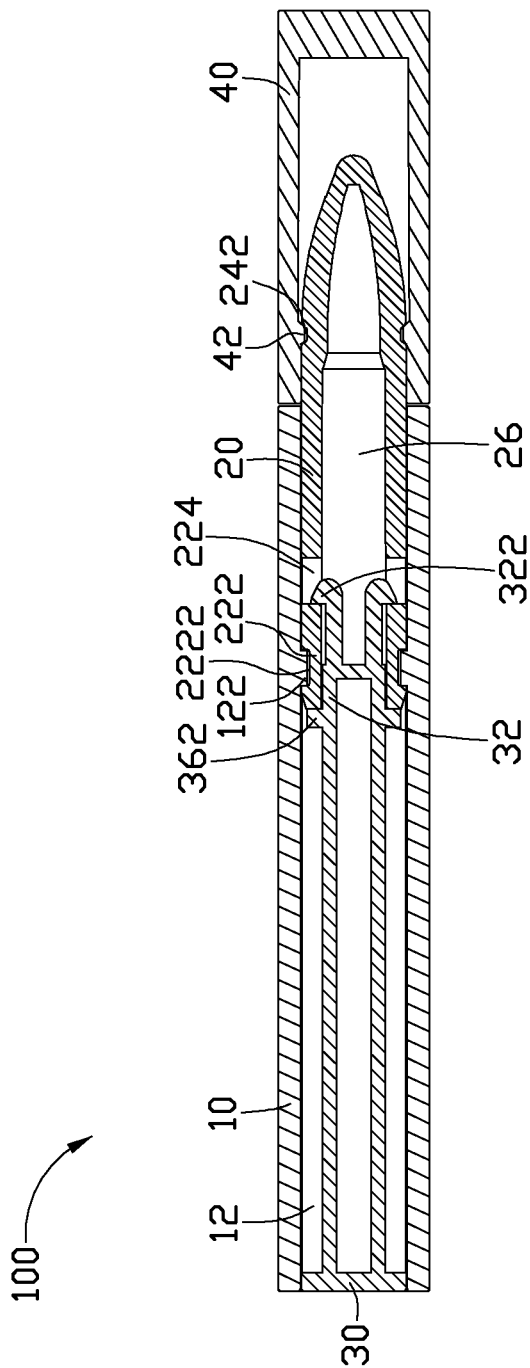
FIG. 3 is a cross-sectional view of the stylus in FIG. 2.

Referring to FIGS. 1 and 3, a stylus 100 includes a housing 10, a stylus body 20 integrally latched in one end of the housing 10 by a retaining structure (not labeled), a positioning element 30 and a cap 40. The positioning element 30 is located in the housing 10 and latches with the stylus body 20 so the stylus body 20 is firmly mounted to the housing 10. The cap 40 covers on the stylus body 20 for protecting the stylus body 20.

The housing 10 is tubular and of any suitable manufacture, and may for example be constructed of a lightweight metal such as stainless steel or aluminum alloy. The housing 10 is hollow, having a receptacle 12 defined longitudinally therethrough.

The stylus body 20 be of any suitable manufacture, and may for example be constructed of a lightweight metal such as stainless steel or aluminum alloy. The stylus body 20 is received within the receptacle 12 of the housing 10 and partially extends out of the housing 10. The stylus body 20, in this exemplary embodiment, may include a body 22 and a head 24. Head 24 protrudes from one end of the body 22. The body 22 has the same general shape and size as the receptacle 12 of the housing 10, so the body 22 can be firmly fitted in the receptacle 12 of the housing 10.

An exemplary retaining structure is illustrated in FIGS. 1 and 3, and provides a mechanism for latching the stylus body 20 to the receptacle 12. The retaining structure, in this embodiment, may include a set of retaining members 122 and a set of retaining slots 2222 that engage the retaining members 122. The retaining members 122 are preferably two raised portions positioned on an inner surface of the housing 10 and the retaining slots 2222 are preferably defined in two opposite boards 222 protruding from a distal end of the body 22 opposite to the head 24. The retaining members 122 are latched in the retaining slots 2222 to latch the stylus body 20 in the receptacle 12 of the housing 10. The stylus body 20 further includes a chamber 26 longitudinally defined therein for accommodating the positioning element 30 when the positioning element 30 is latched with the stylus body 20 like shown in FIG. 3. It is understood that one of ordinary skill in the art would appreciate the retaining structure that comprises the retaining members 122 and the retaining slots 2222 are just one example. It is also understood that the retaining members 122 may be carried on either the stylus body 20 or the housing 10 and the retaining member engaging members (e.g. retaining members 122) may be carried on the element that the retaining members 122 are not carried on.

The stylus body 20 further includes a groove 242 defined at an outer surface thereof between the body 22 and the head 24. The cap 40 is hollow and has protrusions 42 protruding from an inner surface thereof. The protrusions 42 correspond to the groove 242. The protrusions 42 are set in the groove 242 when the cap 40 is covering the head 24, firmly holding the cap 40 on the head 24 to protect the head 24.

A latching structure is illustrated in FIGS. 1 and 3, the latching structure provides a mechanism for latching the positioning element 30 to the stylus body 20. The latching structure includes two opposite L-shaped latches 322 protruding from a distal end of the positioning element 30, two opposite blocks 362 positioned on the positioning element 30 and respectively aligned with the latches 322, two holes 224 defined in the body 22 of the stylus body 20. To latch the positioning element 30 to the stylus body 20, the latches 322 of the positioning element 30 are inserted into the chamber 26 of the stylus body 20 until the latches 322 are latched in the holes 224 and the blocks 362 are resisting distal ends of the boards 222 of the stylus body 20 so the boards 222 are secured between the latches 322 and the blocks 362, thereby latching the positioning element 30 to the stylus body 20. Once the positioning element 30 is latched to the stylus body 20, portion 32 of the positioning element 30 between the latches 322 and the blocks 362 are located between the boards 222 of the stylus body 20 to prevent the blocks 362 from bending toward each other, thereby the retaining members 122 are firmly retained in the retaining slots 2222. Thus, the stylus body 20 is firmly mounted to the housing 10.

Figure 2:
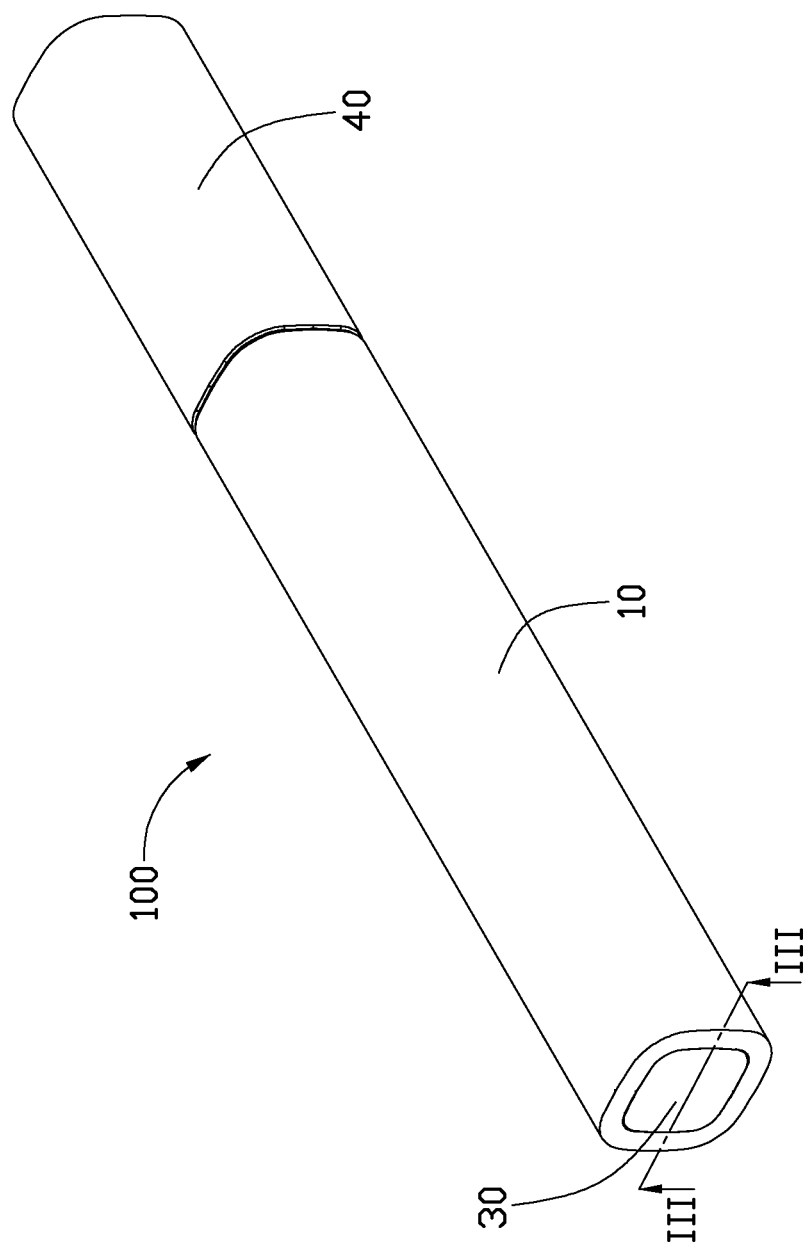
FIG. 2 is an assembled view of the stylus shown in FIG. 1.

Referring to FIGS. 1-3, to assemble the stylus 100, the boards 222 of the stylus body 20 is first inserted in the receptacle 12 of the housing 10 until the retaining members 122 in the housing 10 are aligned with and latched in the retaining slots 2222, respectively. The positioning element 30 is then inserted in the receptacle 12 of the housing 10 until the latches 322 is latched in the holes 224 and the blocks 362 are resisting distal ends of the boards 222 of the stylus body 20 so the boards 222 are secured between the latches 322 and the blocks 362, thereby latching the positioning element 30 to the stylus body 20. At this time, the portion 32 of the positioning element 30 between the latches 322 and the blocks 362 are located between the boards 222 of the stylus body 20 to prevent the blocks 362 from bending toward each other so the stylus body 20 is firmly mounted to the housing 10. Finally, the cap 40 is placed over the head 24 of the stylus body 20 with the protrusions 42 accommodated in the groove 242, to complete assembly of the stylus 100.

In operation, the cap 40 is pulled away from the housing 10 under an external force, until the protrusions 42 are slid out of the groove 242 to remove of the cap 40 from the stylus body 20 so the stylus 100 is ready to use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the apstylus body 20ded claims are expressed.

What is claimed is:

1. A stylus, comprising:
    a housing having a receptacle defined therethrough;
    a stylus body comprising two separate and opposite boards protruding from a distal end of the stylus body; and
    a retaining structure providing a mechanism for the stylus body to be latched in the receptacle of the housing, wherein the retaining structure includes two retaining members and two retaining slots engaging the retaining members, each retaining member comprises a raised portion positioned on an inner surface of the housing, each retaining slot is defined in one of the two boards respectively.

2. The stylus as claimed in claim 1, wherein the stylus further includes a positioning element, the positioning element is located in the housing and latches with the stylus body so the stylus body is firmly mounted to the housing.

3. The stylus as claimed in claim 2, wherein the stylus further includes a latching structure which provides a mechanism for latching the positioning element to the stylus body.

4. The stylus as claimed in claim 3, wherein the latching structure includes two opposite L-shaped latches protruding from a distal end of the positioning element, two opposite blocks positioned on the positioning element and respectively aligned with the latches, two holes defined in the stylus body, the latches is latched in the holes and the blocks resists distal ends of each board of the stylus body so the boards are secured between the latches and the blocks.

5. The stylus as claimed in claim 4, wherein the portion of the positioning element between the latches and the blocks are located between the boards the stylus body to prevent the blocks from bending toward each other, thereby the retaining members are firmly engage in the retaining slots.

6. The stylus as claimed in claim 1, wherein the housing is constructed of a lightweight metal.

7. The stylus as claimed in claim 1, wherein the lightweight metal is stainless steel or aluminum alloy.

\* \* \* \* \*